United States Patent
Yoshitake

(10) Patent No.: US 11,390,715 B2
(45) Date of Patent: Jul. 19, 2022

(54) ORGANOPOLYSILOXANE COMPOSITION

(71) Applicant: DOW TORAY CO., LTD., Tokyo (JP)

(72) Inventor: Makoto Yoshitake, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 0 days.

(21) Appl. No.: 16/761,509

(22) PCT Filed: Nov. 6, 2018

(86) PCT No.: PCT/JP2018/041098
§ 371 (c)(1),
(2) Date: May 5, 2020

(87) PCT Pub. No.: WO2019/093296
PCT Pub. Date: May 16, 2019

(65) Prior Publication Data
US 2021/0179784 A1 Jun. 17, 2021

(30) Foreign Application Priority Data
Nov. 7, 2017 (JP) .............................. JP2017-215136

(51) Int. Cl.
| | |
|---|---|
| C08G 77/20 | (2006.01) |
| C08G 77/08 | (2006.01) |
| B01J 23/42 | (2006.01) |
| C08G 77/14 | (2006.01) |
| C08J 3/24 | (2006.01) |

(52) U.S. Cl.
CPC .............. *C08G 77/08* (2013.01); *B01J 23/42* (2013.01); *C08G 77/14* (2013.01); *C08G 77/20* (2013.01); *C08J 3/247* (2013.01)

(58) Field of Classification Search
CPC ........ C08G 77/12; C08G 77/20; C08G 77/08; C08L 83/04; B01J 23/40; B01J 23/42; C08J 3/247
See application file for complete search history.

(56) References Cited

U.S. PATENT DOCUMENTS

| | | | |
|---|---|---|---|
| 3,220,972 A | * 11/1965 | Lamoreaux | ............... C07F 7/08 528/15 |
| 5,015,716 A | 5/1991 | Togashi et al. | |
| 5,017,654 A | 5/1991 | Togashi et al. | |
| 6,040,361 A | * 3/2000 | Fujiki | .................. C08K 5/0025 523/209 |
| 2013/0072592 A1 | 3/2013 | Inafuku et al. | |
| 2017/0261893 A1 | 9/2017 | Kinuta | |
| 2021/0198489 A1 | 7/2021 | Yoshitake | |

FOREIGN PATENT DOCUMENTS

| | | |
|---|---|---|
| CN | 104098906 A | 10/2014 |
| JP | H0214244 A | 1/1990 |
| JP | H029448 A | 1/1999 |
| JP | H11236508 A | 8/1999 |
| JP | 2012149240 A | 8/2012 |
| JP | 2017161779 A | 9/2017 |
| WO | 2012091167 A2 | 5/2012 |
| WO | 2016160750 A1 | 10/2016 |
| WO | 2017079502 A1 | 5/2017 |

OTHER PUBLICATIONS

Freeman (Silicones, Published For The Plastics Institute, ILIFFE Books Ltd. 1962)(p. 27).*
English translation of International Search Report for PCT/JP2018/041098 dated Feb. 12, 2019, 1 page.
Machine assisted English translation of JPH11236508A obtained from https://patents.google.com/patent on Jul. 28, 2020, 12 pages.
Machine assisted English translation of CN104098906A, obtained from https://patents.google.com/ on Dec. 11, 2021, 7 pages.

* cited by examiner

*Primary Examiner* — Kuo Liang Peng
(74) *Attorney, Agent, or Firm* — Warner Norcross + Judd LLP

(57) ABSTRACT

Provided is a hydrosilylation reactive composition that can be used to obtain an organopolysiloxane cured product having high adhesiveness and sufficient mechanical strength, and a method for manufacturing a cured product using this composition. The composition comprises: (A) a compound including at least one monovalent hydrocarbon group with an aliphatic unsaturated bond per molecule; (B) a compound including at least two hydrogen atoms bonded to a silicon atom per molecule; (C) a first hydrosilylation catalyst; and (D) a second hydrosilylation catalyst including platinum, rhodium, ruthenium, or iridium and exhibiting activity at a temperature at least 30° C. higher than the temperature at which component (C) exhibits activity. Also provided is a method for conducting a hydrosilylation reaction at two different temperature levels using this composition.

11 Claims, No Drawings

ORGANOPOLYSILOXANE COMPOSITION

CROSS-REFERENCE TO RELATED APPLICATIONS

This application is the National Stage of International Appl. No. PCT/JP2018/041098 filed on 6 Nov. 2018, which claims priority to and all advantages of Japanese Appl. No. 2017-215136 filed on 7 Nov. 2017, the content of which is hereby incorporated by reference.

TECHNICAL FIELD

The present invention relates to a composition curable by a hydrosilylation reaction, a method for manufacturing a cured product cured by a hydrosilylation reaction, and a cured product obtained by this method.

BACKGROUND ART

A hydrosilylation reaction is an addition reaction between a hydrosilyl group (—SiH) and an aliphatic unsaturated group, and is widely used as an important means for synthesizing organosilicon compounds. In reactions using organopolysiloxanes in particular, it is used as an important reaction when crosslinking an organopolysiloxane to create a silicone material. The reaction can be started by heat or light, but a radical reaction initiator such as a peroxide or a transition metal complex catalyst such as hexachloroplatinic (IV) acid are commonly used.

Because silicone materials have excellent properties such as chemical resistance, heat resistance, and electrical insulating properties, they are used in a wide variety of applications. Pressure-sensitive adhesives, which is one type of application for silicone materials, are widely used as adhesives in household products, medical supplies, and electronic products. Organopolysiloxane cured products obtained by crosslinking an organopolysiloxane having an unsaturated group with an organohydrogenpolysiloxane are commonly used in silicone pressure-sensitive adhesives (Patent Document 1). Here, an organopolysiloxane cured product with a sufficiently high degree of polymerization has to be used in order to obtain a sufficiently strong silicone pressure-sensitive adhesive with a high degree of adhesiveness. However, methods of the prior art often used to prepare organopolysiloxane cured products often produce cured products with a low degree of polymerization or insufficient crosslinking, and the adhesiveness and mechanical strength of the resulting silicone pressure-sensitive adhesive are often poor.

When performing curing by a hydrosilylation reaction using an organohydrogenpolysiloxane, large variations usually occur in the molecular weight and crosslinking density of the cured product depending on the molecular structure of the organohydrogenpolysiloxane being used. An organohydrogenpolysiloxane contains a hydrogen atom bonded to a silicon atom, and has partial structures known as MH units (—OSiR$_2$H) and DH units (—OSiRH—). An MH unit is present primarily at the end of the molecular chain of the organohydrogenpolysiloxane, and a reaction with the MH unit extends the molecular chain. A DH unit is present inside the molecular chain of an organohydrogenpolysiloxane, and a reaction with the DH unit causes a crosslinking reaction to occur. However, it is difficult to separate the reactions of MH units and DH units using current techniques, and molecular design cannot be performed by controlling the reaction of MH units and DH units.

PRIOR ART DOCUMENTS

Patent Documents

Patent Document 1: JP 2012-149240 A

SUMMARY OF THE INVENTION

Problem to be Solved by the Invention

Therefore, it is an object of the present invention to provide a hydrosilylation reactive composition that can be used to obtain an organopolysiloxane cured product having high adhesiveness and sufficient mechanical strength and a method for manufacturing a cured product using this composition. It is also an object of the present invention to provide a hydrosilylation reactive composition that enables molecular design to be performed by controlling the reaction of MH units and DH units and a method for manufacturing a cured product using this composition.

Means for Solving the Problem

The present invention is a composition comprising component (A) to component (D) below: (A) a compound including at least one monovalent hydrocarbon group with an aliphatic unsaturated bond per molecule; (B) a compound including at least two hydrogen atoms bonded to a silicon atom per molecule; (C) a first hydrosilylation catalyst; and (D) a second hydrosilylation catalyst including platinum, rhodium, ruthenium or iridium and exhibiting activity at a temperature at least 30° C. higher than the temperature at which component (C) exhibits activity.

Component (D) is preferably a carbene complex or a β-diketonato complex of platinum, rhodium, ruthenium, or iridium. Also, at least one of component (A) or component (B) is preferably an organopolysiloxane.

Preferably, component (A) is an organopolysiloxane represented by average composition formula (1) below:

$$R^1_a R^2_b SiO_{(4-a-b)/2} \qquad (1)$$

(where $R^1$ is an alkenyl group having from 2 to 12 carbon atoms, $R^2$ is a group selected from a monovalent hydrocarbon group having from 1 to 12 carbon atoms and no aliphatic unsaturated bond, a hydroxyl group and an alkoxy group, and a and b are numbers satisfying the conditions $1 \le a+b \le 3$ and $0.001 \le a/(a+b) \le 0.33$);

and component (B) is an organopolysiloxane represented by average composition formula (2) below:

$$H_c R^3_d SiO_{(4-c-d)/2} \qquad (2)$$

(where $R^3$ is a group selected from a monovalent hydrocarbon group having from 1 to 12 carbon atoms and no aliphatic unsaturated bond, a hydroxyl group and an alkoxy group, and c and d are numbers satisfying the conditions $1 \le c+d \le 3$ and $0.01 \le c/(c+d) \le 0.33$).

Also, component (B) is preferably an organohydrogenpolysiloxane represented by average composition formula (3) below:

$$(HR^4_2SiO_{1/2})_e(R^4_3SiO_{1/2})_f(HR^4SiO_{2/2})_g(R^4_2SiO_{2/2})_h \\ (HSiO_{3/2})_i(R^4SiO_{3/2})_j(SiO_{4/2})_k(R^5O_{1/2})_l \qquad (3)$$

(where $R^4$ is a group selected from a monovalent hydrocarbon group having from 1 to 12 carbon atoms and no aliphatic unsaturated bond, a hydroxyl group and an alkoxy group, $R^5$ is a hydrogen atom or an alkyl group having from 1 to 6 carbon atoms, and e, f, g, h, i, j, k and l are numbers satisfying the conditions $e+f+g+h+i+j+k=1$, $0 \le l \le 0.1$, $0.01 \le e+g+i \le 0.2$, $0.01 \le e \le 0.6$, $0.01 \le g \le 0.6$, $0 \le i \le 0.4$, $0.01 \le e+f \, 0.8$, $0.01 \le g+h \le 0.8$, $0 \le i+j \le 0.6$).

The molar ratio of the amount of platinum metal in component (C) and in component (D) [(C)/(D)] is preferably from 0.01 to 0.8.

The composition of the present invention is preferably for step curing in which heating is performed at a temperature at which component (C) exhibits activity but component (D) does not exhibit activity and followed by heating at a temperature at which component (D) exhibits activity.

The present invention is also a method for forming a cured product comprising the steps of: (i) heating a composition described above at a temperature at which component (C) exhibits activity but component (D) does not exhibit activity to perform only the first hydrosilylation reaction to obtain a semi-cured product; and (ii) heating the resulting semi-cured product at a temperature at which component (D) exhibits activity to perform the second hydrosilylation reaction and obtain a cured product.

The present invention is also a semi-cured product obtained by heating a composition described above at a temperature at which component (C) exhibits activity but component (D) does not exhibit activity to perform only the first hydrosilylation reaction. The present invention is also a cured product obtained using the method comprising step (i) and step (ii) above.

Effects of the Invention

A composition of the present invention can be used to obtain an organopolysiloxane cured product having high adhesiveness and sufficient mechanical strength. The method of the present invention can be used to create a stable semi-cured state without the use an organic solvent by first reacting $M^H$ units (such as $(CH_3)_2HSiO_{1/2}$ units) to extend the molecular chain and then reacting $D^H$ units (such as $(CH_3)HSiO_{2/2}$ units), thereby providing a material with excellent moldability, and can be used to perform a curing reaction by crosslinking after sufficiently increasing the molecular weight, thereby improving the properties of the resulting material (cured product).

EMBODIMENT OF THE INVENTION (Compositions)

A composition of the present invention comprises components (A) to (D) below. These will now be explained in order.

Component (A)

A composition of the present invention comprises a compound including at least one monovalent hydrocarbon group with an aliphatic unsaturated bond per molecule [Component (A)]. Component (A) is a compound including an aliphatic unsaturated bond to which a hydrosilyl group (—SiH) is added during a hydrosilylation reaction. Examples of component (A) include a linear or branched organopolysiloxane having an alkenyl group, a polyether containing an alkenyl group, a polyolefin containing an alkenyl group and a polyester containing an alkenyl group. Among these an organopolysiloxane represented by average composition formula (1) below is preferred.

$R^1_a R^2_b SiO_{(4-a-b)/2}$     (1)

In average composition formula (1), $R^1$ is an alkenyl group having from 2 to 12 carbon atoms. Specific examples include a vinyl group, allyl group, butenyl group, pentenyl group, hexenyl group, heptenyl group, octenyl group, nonenyl group, decenyl group, undecenyl group, and dodecenyl group. Among these, a vinyl group, an allyl group, or a hexenyl group is preferred. $R^2$ is a group selected from a monovalent hydrocarbon group having from 1 to 12 carbon atoms and no aliphatic unsaturated bond, a hydroxyl group and an alkoxy group. Some of the hydrogen atoms in the monovalent hydrocarbon group having from 1 to 12 carbon atoms may be substituted with a halogen atom or a hydroxyl group. Examples of monovalent hydrocarbon groups having 1 to 12 carbon atoms include an alkyl group such as a methyl group, ethyl group, propyl group, butyl group, pentyl group, hexyl group, heptyl group, octyl group, nonyl group, decyl group, undecyl group, or dodecyl group; an aryl group such as a phenyl group, tolyl group, xylyl group, naphthyl group, anthracenyl group, phenanthryl group, or pyrenyl group; an aralkyl group such as a benzyl group, phenethyl group, naphthylethyl group, naphthylpropyl group, anthracenylethyl group, phenanthrylethyl group, or pyrenylethyl group; and any of these aryl groups or aralkyl groups having a hydrogen atom substituted with a alkyl group such as a methyl group or ethyl group, an alkoxy group such as a methoxy group or ethoxy group, or a halogen atom such as a chlorine atom or a bromine atom.

Also, a and b are numbers satisfying the conditions $1 \le a+b \le 3$ and $0.001 \le a/(a+b) \le 0.33$). When $a+b \ge 1$, the flexibility of the cured product increases. When the $a+b \le 3$, the mechanical strength of the cured product increases. When $a/(a+b) \le 0.001$, the mechanical strength of the cured product increases. When $a/(a+b) \le 0.33$, the flexibility of the cured product increases.

The molecular structure of the organopolysiloxane can be linear, branched or cyclic. The organopolysiloxane may also be a mixture of one or more compounds having these molecular structures.

Component (A) is preferably a linear organopolysiloxane represented by the general formula $R^6_3SiO(R^6_2SiO)_{m1}SiR^6_3$ and/or a branched organopolysiloxane represented by the average unit formula $(R^7SiO_{3/2})_o(R^7_2SiO_{2/2})_p(R^7_3SiO_{1/2})_q$ $(SiO_{4/2})_r(XO_{1/2})_s$. In these formulas, each $R^6$ and $R^7$ is independently an unsubstituted or halogen-substituted monovalent hydrocarbon group. Examples are the same as those listed above. However, at least two $R^6$ or $R^7$ are alkenyl groups. The alkenyl groups are preferably vinyl groups. In the formula, m1 is an integer in a range from 5 to 1,000. In the formula, o is a positive number, p is 0 or a positive number, q is 0 or a positive number, r is 0 or a positive number, s is 0 or a positive number, p/o is a number in a range from 0 to 10, q/o is a number in a range from 0 to 5, r/(o+p+q+r) is a number in a range from 0 to 0.3, and s/(o+p+q+r) is a number in a range from 0 to 0.4.

Component (B)

A composition of the present invention comprises a compound including at least two hydrogen atoms bonded to a silicon atom per molecule [component (B)]. Component (B) is a compound including a hydrosilyl group (—SiH) added to the aliphatic unsaturated bond in component (A) during a hydrosilylation reaction. Component (B) is preferably an organopolysiloxane having average composition formula (2) below.

$H_c R^3_d SiO_{(4-c-d)/2}$     (2)

In average composition formula (2), $R^3$ is a group selected from a monovalent hydrocarbon group having from 1 to 12 carbon atoms and no aliphatic unsaturated bond, a hydroxyl group and an alkoxy group. Some of the hydrogen atoms in the monovalent hydrocarbon group having from 1 to 12 carbon atoms may be substituted with a halogen atom or a hydroxyl group. Examples of monovalent hydrocarbon groups having 1 to 12 carbon atoms include an alkyl group such as a methyl group, ethyl group, propyl group, butyl group, pentyl group, hexyl group, heptyl group, octyl group, nonyl group, decyl group, undecyl group, or dodecyl group; an aryl group such as a phenyl group, tolyl group, xylyl group, naphthyl group, anthracenyl group, phenanthryl group, or pyrenyl group; an aralkyl group such as a benzyl group, phenethyl group, naphthylethyl group, naphthylpropyl group, anthracenylethyl group, phenanthrylethyl group, or pyrenylethyl group; and any of these aryl groups or aralkyl groups having a hydrogen atom substituted with alkyl group such as methyl group or ethyl group, an alkoxy group such as methoxy group or ethoxy group, or a halogen atom such as a chlorine atom or a bromine atom.

Examples of alkoxy groups include a methoxy group, ethoxy group, propoxy group, butoxy group, pentanoxy group, hexanoxy group, or octanoxy group.

Also, c and d are numbers satisfying the conditions $1 \leq c+d \leq 3$ and $0.01 \leq c/(c+d) \leq 0.33$, preferably $1.5 \leq c+d \leq 2.5$ and $0.05 \leq c/(c+d) \leq 0.2$. When $c+d \geq 1$, the flexibility of the cured product increases. When the $c+d \leq 3$, the mechanical strength of the cured product increases. When $c/(c+d) \geq 1.5$, the mechanical strength of the cured product increases. When $c/(c+d) \leq 0.33$, the flexibility of the cured product increases.

There are no particular restrictions on the viscosity of the organopolysiloxane having average composition formula (2). However, the viscosity at 25° C. is preferably in the range from 1 to 10,000 mPa·s and more preferably in a range from 1 to 1,000 mPa·s.

Examples of organopolysiloxanes having average composition formula (2) include 1,1,3,3-tetramethyldisiloxane, 1,3,5,7-tetramethylcyclotetrasiloxane, tris (dimethylhydrogensiloxy) methylsilane, tris (dimethylhydrogensiloxy) phenylsilane, 1-(3-glycidoxypropyl)-1,3,5,7-tetramethylcyclotetrasiloxane, 1,5-di (3-glycidoxypropyl)-1,3,5,7-tetramethylcyclotetrasiloxane, 1-(3-glycidoxypropyl)-5-trimethoxysilylethyl-1,3,5,7-tetramethylcyclotetrasiloxane, methyl hydrogen polysiloxane capped at both ends of the molecular chain with a trimethylsiloxy group, a dimethylsiloxane/methylhydrogensiloxane copolymer capped at both ends of the molecular chain with a trimethylsiloxy group, dimethylpolysiloxane capped at both ends of the molecular chain with a dimethylhydrogensiloxy group, a dimethyl siloxane/methyl hydrogen siloxane copolymer capped at both ends of the molecular chain with a dimethyl hydrogen siloxy group, a methyl hydrogen siloxane/diphenyl siloxane copolymer capped at both ends of the molecular chain with a trimethylsiloxy group, a methyl hydrogen siloxane/diphenyl siloxane/dimethyl siloxane copolymer capped at both ends of the molecular chain with a trimethylsiloxy group, a hydrolysis condensate of trimethoxysilane, a copolymer consisting of $(CH_3)_2HSiO_{1/2}$ units and $SiO_{4/2}$ units, a copolymer consisting of $(CH_3)_2HSiO_{1/2}$ units, $SiO_{4/2}$ units and $(C_6H_5)SiO_{3/2}$ units, and mixtures of two or more of these.

Examples of organopolysiloxanes having average composition formula (2) include the following organopolysiloxanes. In the following formulas, Me and Ph represent a methyl group and a phenyl group, respectively, m2 is an integer from 1 to 100, n2 is an integer from 1 to 50, and b2, c2, d2 and e2 are all positive numbers. The total of b2, c2, d2 and e2 in a molecule is 1.

HMe$_2$SiO(Ph$_2$SiO)$_{m2}$SiMe$_2$H
HMePhSiO(Ph$_2$SiO)$_{m2}$SiMePhH
HMePhSiO(Ph$_2$SiO)$_{m2}$(MePhSiO)$_{n2}$SiMePhH
HMePhSiO(Ph$_2$SiO)$_{m2}$(Me$_2$SiO)$_{n2}$SiMePhH
(HMe$_2$SiO$_{1/2}$)$_{b2}$(PhSiO$_{3/2}$)$_{c2}$
(HMePhSiO$_{1/2}$)$_{b2}$(PhSiO$_{3/2}$)$_{c2}$
(HMePhSiO$_{1/2}$)$_{b2}$(HMe$_2$SiO$_{1/2}$)$_{c2}$(PhSiO$_{3/2}$)$_{d2}$
(HMe$_2$SiO$_{1/2}$)$_{b2}$(Ph$_2$SiO$_{2/2}$)$_{c2}$(PhSiO$_{3/2}$)$_{d2}$
(HMePhSiO$_{1/2}$)$_{b2}$(Ph$_2$SiO$_{2/2}$)$_{c2}$(PhSiO$_{3/2}$)$_{d2}$
(HMePhSiO$_{1/2}$)$_{b2}$(HMe$_2$SiO$_{1/2}$)$_{c2}$(Ph$_2$SiO$_{2/2}$)$_{d2}$(PhSiO$_{3/2}$)$_{e2}$

Component (B) is preferably an organohydrogenpolysiloxane represented by average composition formula (3) below.

$$(HR^4{}_2SiO_{1/2})_e(R^4{}_3SiO_{1/2})_f(HR^4SiO_{2/2})_g(R^4{}_2SiO_{2/2})_h \\ (HSiO_{3/2})_i(R^4SiO_{3/2})_j(SiO_{4/2})_k(R^5O_{1/2})_l \quad (3)$$

In average composition formula (3), $R^4$ is a group selected from a monovalent hydrocarbon group having from 1 to 12 carbon atoms and no aliphatic unsaturated bond, a hydroxyl group and an alkoxy group (provided the hydrocarbon group is not an alkenyl group or a group having an alkenyl group). The monovalent hydrocarbon groups having from 1 to 12 carbon atoms and no aliphatic unsaturated bond, hydroxyl groups and alkoxy groups are the same as those listed above. $R^5$ is a hydrogen atom or an alkyl group having from 1 to 6 carbon atoms, and examples of alkyl groups having from 1 to 6 carbon atoms include a methyl group, ethyl group, propyl group, butyl group, and hexyl group. Also, e, f, g, h, i, j, k and l are numbers satisfying the conditions $e+f+g+h+i+j+k=1$, $0 \leq l \leq 0.1$, $0.01 \leq e+g+i \leq 0.2$, $0.01 \leq e \leq 0.6$, $0.01 \leq g \leq 0.6$, $0 \leq i \leq 0.4$, $0.01 \leq e+f \leq 0.8$, $0.01 \leq g+h \leq 0.8$, $0 \leq i+j \leq 0.6$.

The structural units $HR^4{}_2SiO_{1/2}$, $R^4{}_3SiO_{1/2}$, $HR^4SiO_{2/2}$, $R^4{}_2SiO_{2/2}$, $HSiO_{3/2}$, $R^4SiO_{3/2}$ and $SiO_{4/2}$ mentioned above are partial structural units of an organohydrogenpolysiloxane known as an $M^H$ unit, M unit, $D^H$ unit, D unit, $T^H$ unit, T unit, and Q unit, respectively, and $R^5O_{1/2}$ is a group bonded with an oxygen atom in a D unit, $D^H$ unit, T unit, $T^H$ unit or Q unit, and refers to a silicon-bonded hydroxyl group (Si—OH) in the organopolysiloxane or a silicon-bonded alkoxy group that has remained unreacted during production of the organopolysiloxane. MH units are present mainly at the end of the molecular chain of the organohydrogenpolysiloxane and the DH units are present inside the molecular chain of the organohydrogenpolysiloxane.

The amount of component (B) per mol of alkenyl groups in component (A) is in a range from 0.1 to 5 mol and preferably in a range of 0.5 to 2 mol in terms of the silicon-bonded hydrogen atoms in the component. When the amount of component (B) is above the lower limit of this range, the mechanical strength of the cured product is high. When the amount is below the upper limit of this range, the flexibility of the cured product is high.

Component (C)

A composition of the present invention comprises a first hydrosilylation catalyst exhibiting activity in the composition at a relatively low temperature [component (C)]. Component (C) is the hydrosilylation catalyst used to obtain a semi-cured composition. Here, "semi-cured" means a viscous substance that exhibits fluidity at room temperature or a thermoplastic substance that does not exhibit fluidity at room temperature but that does exhibit fluidity at 100° C. Here, a viscous substance means the viscosity at 25° C. is from 1.5 to 100 times the initial viscosity of the composition. A thermoplastic substance means a viscosity at 100° C. of no more than 1,000,000 mPa·s. Component (C) is a hydrosilylation catalyst exhibiting activity at a temperature at least 30° C. lower than that of component (D) described below. It is preferably selected from platinum-based hydrosilylation catalysts other than the carbene complexes or β-diketonato complexes of platinum, rhodium, ruthenium, or iridium in component (D).

Examples of first hydrosilylation catalysts include platinum-based catalysts, rhodium-based catalysts, palladium-based catalysts, nickel-based catalysts, iridium-based catalysts, ruthenium-based catalysts, and iron-based catalysts. It is preferably a platinum-based catalyst other than those in component (D) described below. Examples of platinum-based catalysts include platinum-based compounds such as platinum fine powder, platinum black, platinum-supported silica fine powder, platinum-supported activated carbon, chloroplatinic acid, alcohol solutions of chloroplatinic acid, olefin complexes of platinum, and alkenylsiloxane complexes of platinum. An alkenylsiloxane complex of platinum is preferred. Examples of alkenylsiloxanes include 1,3-divinyl-1,1,3,3-tetramethyldisiloxane, 1,3,5,7-tetramethyl-1,3,5,7-tetravinylcyclotetrasiloxane, these alkenylsiloxanes in which some of the methyl groups have been substituted with ethyl groups or phenyl groups etc., and these alkenylsiloxanes in which some of the vinyl groups have been substituted with allyl groups or hexenyl groups, etc. Here, 1,3-divinyl-1,1,3,3-tetramethyldisiloxane is especially preferred because the stability of the platinum-alkenylsiloxane complex is good. In order to improve the stability of a platinum-alkenylsiloxane complex, an alkenylsiloxane such as 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane or 1,3,5,7-tetramethyl-1,3,5,7-tetravinylcyclotetrasiloxane, or an organosiloxane oligomer such as a dimethylsiloxane oligomer is preferably added to the complex. The addition of an alkenylsiloxane is especially preferred.

Although it varies depending on the type and amount of catalyst and the type of composition used, the catalyst in component (C) usually exhibits activity in the composition and promotes a hydrosilylation reaction at or above room temperature, at or above 25° C. or at or above 30° C., and at or below 120° C., at or below 100° C., at or below 80° C., or sometimes at or below 60° C. The amount of component (C) in the composition depends on the type of catalyst and the type of composition, but is usually in a range from 0.01 to 50 ppm by weight, and preferably in a range from 0.1 to 30 ppm by weight, in terms of the amount of metal atoms in the catalyst. When, for example, component (B) is an organohydrogenpolysiloxane represented by average composition formula (3), the amount of component (C) used is an amount able to hydrosilylate the MH units in the organohydrogenpolysiloxane.

Component (D)

A composition of the present invention comprises a second hydrosilylation catalyst including platinum, rhodium, ruthenium or iridium and exhibiting activity at a temperature at least 30° C. higher than the temperature at which component (C) exhibits activity [component (D)]. An example of a component (D) includes a carbene complex or a β-diketonato complex of platinum, rhodium, ruthenium, or iridium. This catalyst exhibits hydrosilylation reaction catalytic activity at a temperature at least 30° C. higher than that of component (C) due to the strong interaction between the platinum-based metal and the complexing agent. In this way, a two-stage reaction can be conducted using this temperature difference.

The β-diketonato complex used as component (D) can be acetylacetonate (Hacac), 3-methylacetylacetonate (Hmaa), propionylacetonate (Hpra), benzoylacetonate (Hbza), or trifluoroacetylacetonate (Htfa). However, acetylacetonate (Hacac) is especially preferred. The carbene complex used as component (D) is preferably 1,3-bis (2,6-diisopropylphenyl) imidazole-2-ylidene or 1,3-bis (cyclohexyl) imidazole-2-ylidene.

Component (D) is typically a carbene complex of platinum or a β-diketonato complex of platinum. Specific examples include a bis (acetylacetonato) platinum (II) complex, a bis (propionylacetonato) platinum (II) complex, a [1,3-bis (2,6-diisopropylphenyl) imidazole-2-ylidene] [1,3-divinyl-1,1,3,3-tetramethyldilyloxane [platinum (0)] complex, and a [1,3-bis (cyclohexyl) imidazole-2-ylidene] [1,3-divinyl-1,1,3,3-tetramethyldilyloxane [platinum (0)] complex.

Component (D) exhibits activity at a temperature at least 30° C. higher and preferably at least 50° C. higher than the temperature at which component (C) exhibits activity. Although it depends on the type of catalyst used, the temperature at which activity is exhibited is at least 80° C., preferably 100° C., and more preferably at least 120° C.

The amount of component (D) used is an amount required to cure the composition that was semi-cured by component (C). When, for example, component (B) is an organohydrogenpolysiloxane represented by average composition formula (3), the amount of component (D) used is an amount able to hydrosilylate the DH units in the organohydrogenpolysiloxane.

The molar ratio of the amount of platinum metal in component (C) and in component (D) [(C)/(D)] is from 0.01 to 100, preferably from 0.01 to 10, and more preferably from 0.01 to 0.8. When the molar ratio of the amount of platinum metal in both components is below the upper limit, the curing reaction can be accelerated at high temperatures. When the molar ratio is above the lower limit, the curing reaction can be conducted at a low temperature in a short amount of time.

The composition preferably does not contain a hydrosilylation reaction inhibitor. A hydrosilylation reaction inhibitor is usually added to a composition to stabilize and improve the pot life of the composition. However, the present inventors discovered that, by using very small amounts of two or more catalysts with catalytic activity at different temperatures without adding a hydrosilylation reaction inhibitor, they could obtain a semi-cured resin by separating the $M^H$ unit reaction and the $D^H$ unit reaction and selectively conduct an $M^H$ unit reaction, and that they could perform molecular design by controlling the $M^H$ unit and $D^H$ unit reactions.

Component (E)

If necessary, the composition may also include another organopolysiloxane, an adhesive agent, an inorganic filler such as silica, glass, alumina or zinc oxide, an organic resin filler such as a polymethacrylate resin, a phosphor, a heat-resistant agent, a dye, a pigment, a flame retardant, or a solvent. An inorganic filler is added to increase the volume of the composition, reinforce the physical strength of the composition, or to add a function to the composition such as electrical conductivity or heat conductivity.

(Method for Forming Cured Products)

Another aspect of the present invention is a method for forming a cured product comprising the following steps:

(i) heating a composition described above at a temperature at which component (C) exhibits activity but component (D) does not exhibit activity to perform only the first hydrosilylation reaction to obtain a semi-cured product; and (ii) heating the resulting semi-cured product at a temperature at which component (D) exhibits activity to perform the second hydrosilylation reaction and obtain a cured product.

Step (i)

In step (i), the composition described above is heated at a temperature at which component (C) exhibits activity but component (D) does not exhibit activity so that only the first hydrosilylation reaction is performed and a semi-cured product is obtained. At this temperature, the second hydrosilylation reaction does not occur. The first hydrosilylation reaction can be conducted at room temperature without heat, but heating can be performed at a temperature of 25° C. or more or 30° C. or more, and sometimes at a temperature of 50° C. or more, in order to increase the speed of the semi-curing process. The heating temperature is 120° C. or less or 100° C. or less, and sometimes 80° C. or less.

After step (i), the composition is in a semi-cured state. In the present invention, "semi-cured" means a viscous substance that exhibits fluidity at room temperature or a thermoplastic substance that does not exhibits fluidity at room temperature but that does exhibit fluidity at 100° C. Here, a viscous substance means the viscosity at 25° C. is from 1.5 to 100 times the initial viscosity of the composition. A thermoplastic substance (reactive hot melt) means fluidity has been lost at room temperature (25° C.) but the substance can be heated to a high temperature (for example, 120° C. or more), remelted, and cured with a viscosity at 100° C. of no more than 1,000,000 mPa·s. A B-stage compound can be obtained by step (i). Here, B-stage means a B-stage state (curing intermediate of a thermosetting resin) as defined in JIS K 6800. While an incompletely cured silicone composition swells in a solvent, it does not completely melt. (This is referred to simply as the "B-stage" in the present specification.) When the composition contains an organopolysiloxane containing MH units and DH units, hydrosilylation of the MH units is given priority in step (i), causing the molecular chain to be extended and the molecular weight of the organopolysiloxane to increase to a sufficient level. This is believed to be the reason that the composition is no longer fluid and becomes semi-cured.

Step (ii)

In Step (ii), the semi-cured product described above is at a temperature at which component (D) exhibits activity to perform the second hydrosilylation reaction and obtain a cured product. The heating temperature in step (ii) is preferably a temperature at least 20° C. higher than the temperature in step (i) or the heating temperature in step (ii) is a temperature at least 30° C. higher than the temperature in step (i). The heating temperature in step (ii) is more preferably a temperature at least 50° C. higher than the temperature in step (i).

The heating temperature is sometimes 80° C. or more or 100° C. or more or 120° C. or more. At the same time, the heating temperature is sometimes 200° C. or less or 180° C. or less or 160° C. or less.

After step (ii), the semi-cured composition is in a cured state, and various materials can be used. When the composition contains an organopolysiloxane containing $M^H$ units and $D^H$ units, the organopolysiloxane whose molecular chain had been extended sufficiently by step (i) can be crosslinked by the second hydrosilylation reaction to obtain a cured product with a high crosslinking density.

A cured product formed using the method of the present invention has excellent physical properties such as excellent adhesiveness and mechanical properties. Because a cured product is obtained via a stable semi-cured state in the method of the present invention, it can be used in a wide variety of applications. For example, the composition can be applied to a film substrate, tape substrate or sheet substrate and cured via step (i) and step (ii) above. The composition may also be disposed between two substrates and successively cured in step (i) and step (ii) to bond the composition securely to both substrates, and the composition may be smoothly applied to the surface of at least one of the substrates and semi-cured to a non-fluid state in step (i) before affixing both substrates to each other and curing the composition in step (ii) to bond the composition securely to both substrates. There are no particular restrictions on the thickness of the cured product, but is preferably from 1 to 100,000 μm and more preferably from 50 to 30,000 μm.

A cured product formed using the method of the present invention can be used in applications such as pressure-sensitive adhesives and adhesive primers.

EXAMPLES

Cured products were obtained from compositions containing the following components. In the average composition formulas, Me and Vi represent a methyl group and vinyl group, respectively. The hardness of the cured products was measured using a type-A durometer in accordance with JIS K 6253-1997, "Hardness testing methods for vulcanized rubber and thermoplastic rubbers" (referred to simply as the "Shore hardness (Shore A)" below) or measured as the degree of penetration in accordance with JIS K 2220 [¼ cone (direct reading)].

Example 1

A composition was prepared that contained 58.5 parts by weight vinyl-terminated branched polysiloxane represented by the average unit formula $(Me_2ViSiO_{1/2})_{0.1}(Me_3SiO_{1/2})_{0.4}(SiO_{4/2})_{0.5}$ (A-1), 14.0 parts by weight of a branched polysiloxane represented by the average unit formula $(Me_3SiO_{1/2})_{0.44}(SiO_{4/2})_{0.56}$ (E-1), 1.8 parts by weight of a vinyl-terminated branched polysiloxane represented by the average unit formula $ViMe_2SiO(SiMe_2O)_{160}SiMe_2Vi$ (A-2), 26.1 parts by weight of a linear polysiloxane represented by the average formula $HMe_2SiO(SiMe_2O)_{400}SiMe_2H$ (B-1), 4.7 parts by weight of the linear polysiloxane represented by the average formula $Me_3SiO(SiMe_2O)_{30}(SiMeHO)_{30}SiMe_3$ (B-2), platinum-1,3-divinyl-1,1,3,3-tetramethyldisiloxane complex (C-1) in an amount of 0.2 ppm in terms of platinum atoms, and bis (acetylacetonato) platinum (II) complex (D-1) in an amount of 5 ppm in terms of platinum atoms. The viscosity of the composition was 3,500 mPa·s. The composition was heated for 30 minutes at 90° C. to obtain a B-stage solid that did not exhibit fluidity at 25° C. but did exhibit fluidity at 100° C. The resulting B-stage solid remained in a B-stage state even after storage for two months at 25° C. The B-stage solid was heated for up to 10 minutes at 150° C. to obtain a silicone elastomer with a Shore hardness (Shore A) of 80.

Example 2

A composition was prepared that contained 33.8 parts by weight of A-1, 30.0 parts by weight of E-1, 21.8 parts by weight of A-2, 16.5 parts by weight of B-1, 3.0 parts by weight of B-2, C-1 in an amount of 0.1 ppm in terms of platinum atoms, and [1,3-bis (2,6-diisopropylphenyl) imidazole-2-ylidene] [1,3-divinyl-1,1,3,3-tetramethyldilyloxane [platinum (0)] (D-2) in an amount of 2 ppm in terms of platinum atoms. The viscosity of the composition was 2,800 mPa·s. The composition was heated for 30 minutes at 90° C. to obtain a B-stage solid that did not exhibit fluidity at 25° C. but did exhibit fluidity at 100° C. The resulting B-stage solid remained in a B-stage state even after storage for two months at 25° C. The B-stage solid was heated for up to 10 minutes at 150° C. to obtain a silicone elastomer with a Shore hardness (Shore A) of 35.

Example 3

A composition was prepared that contained 94.3% by weight of a vinyl-terminated linear polysiloxane represented by the average composition formula $ViMe_2SiO(SiMe-PhO)_{36}SiMe_2Vi$ (A-3), 1.0% by weight of a vinyl-containing polysiloxane represented by the average composition formula $(ViMe_2SiO_{1/2})_{0.22}(MeXSiO_{2/2})_{0.12}(PhSiO_{3/2})0.66$ (where X represents a glycidoxypropyl group) (A-4), 3.9% by weight of a linear polysiloxane represented by the average formula $Ph_2Si(OSiMe_2H)_2$ (B-3), 0.8% by weight of a cyclic polysiloxane represented by the average composition formula $(HMeSiO_{2/2})_4$ (B-4), C-1 in an amount of 0.2 ppm in terms of platinum atoms, and D-1 in an amount of 5 ppm in terms of platinum atoms. The viscosity of the composition was 6,000 mPa·s. The composition was heated for 30 minutes at 80° C. to a viscous substance with a viscosity of 12,000 mPa·s. The resulting viscous substance had a viscosity of approximately 18,000 Pa·s and exhibited fluidity after storage for one month at 25° C., and a cured gel composition was obtained with a degree of penetration of 30 after heating the viscous substance to 150° C. for up to 10 minutes.

Comparative Example 1

A composition was prepared that contained 58.5 parts by weight of A-1, 14.0 parts by weight of E-1, 1.8 parts by weight of A-2, 26.1 parts by weight of B-1, 4.7 parts by weight of B-2, and C-1 in an amount of 2 ppm in terms of platinum atoms. The viscosity of the composition was 3,500 mPa·s. The composition was heated for 30 minutes at 90° C. to obtain a cured product with a Shore hardness (Shore A) of 80. When the composition was heated for 30 minutes at 50° C. to obtain a softer cured product, a cured product was obtained with a Shore hardness of 40. While soft, the resulting cured product did not exhibit fluidity and did not reach a B-stage state even when heated to 100° C. The hardness of the cured product gradually increased over time and reached a Shore hardness (Shore A) of 75 after two weeks at 25° C.

Comparative Example 2

A composition was prepared that contained 33.8 parts by weight of A-1, 30.0 parts by weight of E-1, 21.8 parts by weight of A-2, 16.5 parts by weight of B-1, 3.0 parts by weight of B-2, and D-2 in an amount of 2 ppm in terms of platinum atoms. The viscosity of the composition was 2,800 mPa·s. The composition was heated for 30 minutes at 90° C. but no change was observed in the composition. The composition was heated for 30 minutes at 120° C. to obtain a cured product with a Shore hardness (Shore A) of 30 that never reached a B-stage state.

Comparative Example 3

A composition was prepared that contained 94.3% by weight of A-3, 1.0% by weight of A-4, 3.9% by weight of B-3, 0.8% by weight of B-4, and C-1 in an amount of 2 ppm in terms of platinum atoms. The viscosity of the composition was 6,000 mPa·s. The composition became viscous immediately after preparation but no longer exhibited fluidity after another 30 minutes. A viscous substance or B-stage solid was never obtained. Instead, a gel cured product with a degree of penetration of 30 was obtained after one day.

INDUSTRIAL APPLICABILITY

Because a composition of the present invention can be used to obtain an organopolysiloxane cured product having high adhesiveness and sufficient mechanical strength, it is suitable for use as an adhesive or pressure-sensitive adhesive between layers of an image display device.

A composition of the present invention can be used as various types of potting agents, sealants, adhesives, and pressure-sensitive adhesives, especially as optical adhesive and pressure-sensitive adhesives. Because the composition becomes a cured product via a semi-cured product or viscous product (including B-stage materials), the volume change due to curing shrinkage from applied composition to final cured product can be suppressed and problems due to gaps between members and poor adhesion can be reduced. The present composition is especially useful as an optical adhesive or pressure-sensitive adhesive in a display. Because the cured product does not become discolored or cloudy under high-temperature or high-temperature/high-humidity conditions, it can be used to form an intermediate layer between the image display unit and the protective portion of a display.

Because a composition of the present invention has excellent curability, retains transparency and sharp curing properties in reactions after storage under high-temperature/high-humidity conditions, and produces a cured product that is unlikely to become discolored or cloudy, it can be used as an adhesive or pressure-sensitive adhesive in optical display devices (including touch panels) and optical semiconductor devices (including microLEDs). A composition of the present invention or a semi-cured or viscous product thereof (including a B-stage material) can be used in optical displays and to affix or fill space between transparent members. For example, it can be used to form adhesive layers in solar cells, insulated glass (smart glass), optical waveguides, and projector lenses (multilayer lenses, polarizing/optical film bonding).

Because there is very little curing shrinkage from the liquid or semi-cured state to the final cured product, a composition of the present invention combines the general advantages of a silicone cured product (reduction in display and optical member defects and reduction in problems such as uneven images) with reductions in problems caused by curing shrinkage and with flexibility and strong bonding strength that conforms to the adherend and effectively reduces delamination. As a result, a composition of the present invention can be used as an optical adhesive layer in displays with a flat or curved display surface, such as in-vehicle displays and laptop displays using a projector lens.

The invention claimed is:
1. A composition comprising:
   (A) a compound including at least one monovalent hydrocarbon group with an aliphatic unsaturated bond per molecule;
   (B) a compound including at least two hydrogen atoms bonded to a silicon atom per molecule;
   (C) a first hydrosilylation catalyst; and
   (D) a second hydrosilylation catalyst including platinum, rhodium, ruthenium, or iridium and exhibiting activity at a temperature at least 30° C. higher than the temperature at which component (C) exhibits activity;
wherein component (B) is an organohydrogenpolysiloxane represented by average composition formula (3) below:

$$(HR^4{}_2SiO_{1/2})_e(R^4{}_3SiO_{1/2})_f(HR^4SiO_{2/2})_g(R^4{}_2SiO_{2/2})_h (HSiO_{3/2})_i(R^4SiO_{3/2})_j(SiO_{4/2})_k(R^5O_{1/2})_l \quad (3);$$

where $R^4$ is a group selected from a monovalent hydrocarbon group having from 1 to 12 carbon atoms and no aliphatic unsaturated bond, a hydroxyl group and an alkoxy group, $R^5$ is a hydrogen atom or an alkyl group having from 1 to 6 carbon atoms, and e, f, g, h, i, j, k and l are numbers satisfying the conditions: (e+f+g+h+i+j+k)=1, $0 \leq l \leq 0.1$, $0.01 \leq (e+g+i) \leq 0.2$, $0.01 \leq e \leq 0.6$, $0.01 \leq g \leq 0.6$, $0 \leq i \leq 0.4$, $0.01 \leq (e+f) \leq 0.8$, $0.01 \leq (g+h) \leq 0.8$, and $0 \leq (i+j) \leq 0.6$.

2. The composition according to claim 1, wherein component (D) is a carbene complex or a β-diketonato complex of platinum, rhodium, ruthenium, or iridium.

3. The composition according to claim 1, wherein components (A) and (B) are both organopolysiloxanes.

4. The composition according to claim 1, wherein component (A) is an organopolysiloxane represented by average composition formula (1) below:

$$R^1{}_aR^2{}_bSiO_{(4-a-b)/2} \quad (1);$$

where $R^1$ is an alkenyl group having from 2 to 12 carbon atoms, $R^2$ is a group selected from a monovalent hydrocarbon group having from 1 to 12 carbon atoms and no aliphatic unsaturated bond, a hydroxyl group and an alkoxy group, and a and b are numbers satisfying the conditions: $1 \leq (a+b) \leq 3$ and $0.001 \leq k(a/(a+b)) \leq 0.33$.

5. The composition according to claim 1, wherein the molar ratio of the amount of platinum metal in component (C) and in component (D) [(C)/(D)] is from 0.01 to 0.8.

6. The composition according to claim 1, wherein the composition is adapted for step curing in which heating is performed at a temperature at which component (C) exhibits activity but component (D) does not exhibit activity and followed by heating at a temperature at which component (D) exhibits activity.

7. A method for forming a cured product, the method comprising:
(i) heating the composition according to claim 1 at a temperature at which component (C) exhibits activity but component (D) does not exhibit activity to perform only a first hydrosilylation reaction to obtain a semi-cured product; and
(ii) heating the resulting semi-cured product at a temperature at which component (D) exhibits activity to perform a second hydrosilylation reaction and obtain a cured product.

8. A cured product obtained by the method according to claim 7.

9. A semi-cured product obtained by heating the composition according to claim 1 at a temperature at which component (C) exhibits activity but component (D) does not exhibit activity to perform only a first hydrosilylation reaction.

10. A method for forming a cured product from a composition comprising:
(A) a compound including at least one monovalent hydrocarbon group with an aliphatic unsaturated bond per molecule;
(B) a compound including at least two hydrogen atoms bonded to a silicon atom per molecule;
(C) a first hydrosilylation catalyst; and
(D) a second hydrosilylation catalyst including platinum, rhodium, ruthenium, or iridium and exhibiting activity at a temperature at least 30° C. higher than the temperature at which component (C) exhibits activity, with the method comprising:
(i) heating a composition at a temperature at which component (C) exhibits activity but component (D) does not exhibit activity to perform only a first hydrosilylation reaction to obtain a semi-cured product; and
(ii) heating the resulting semi-cured product at a temperature at which component (D) exhibits activity to perform a second hydrosilylation reaction and obtain a cured product.

11. A semi-cured product formed from a composition comprising:
(A) a compound including at least one monovalent hydrocarbon group with an aliphatic unsaturated bond per molecule;
(B) a compound including at least two hydrogen atoms bonded to a silicon atom per molecule;
(C) a first hydrosilylation catalyst; and
(D) a second hydrosilylation catalyst including platinum, rhodium, ruthenium, or iridium and exhibiting activity at a temperature at least 30° C. higher than the temperature at which component (C) exhibits activity;
wherein the semi-cured product is obtained by heating the composition at a temperature at which component (C) exhibits activity but component (D) does not exhibit activity to perform only a first hydrosilylation reaction.

* * * * *